United States Patent [19]

Shelton

[11] 4,334,744
[45] Jun. 15, 1982

[54] PHOTOGRAPHIC APPARATUS HAVING SYNCHRONIZED FLASH

[75] Inventor: William A. Shelton, Cambridge, Mass.

[73] Assignee: Polaroid Corporation, Cambridge, Mass.

[21] Appl. No.: 172,861

[22] Filed: Jul. 28, 1980

Related U.S. Application Data

[63] Continuation-in-part of Ser. No. 145,614, May 1, 1980, abandoned.

[51] Int. Cl.³ .................... G03B 15/05; G03B 13/20
[52] U.S. Cl. ........................................ 354/27; 354/33; 354/60 F; 354/195
[58] Field of Search ................ 354/33, 25, 27, 34, 354/60 F, 195–201, 137, 139, 149

[56] References Cited

U.S. PATENT DOCUMENTS 3,634,725 1/1972 Biber .............................. 315/241 P
3,646,865 3/1972 Biber .
3,714,443 1/1973 Ogawa ........................... 250/214 P
4,167,316 9/1979 Johnson et al. .................. 354/197
4,188,103 2/1980 Biber et al. ....................... 354/27

FOREIGN PATENT DOCUMENTS 2943388 4/1980 Fed. Rep. of Germany .

Primary Examiner—L. T. Hix
Assistant Examiner—W. J. Brady
Attorney, Agent, or Firm—Alfred E. Corrigan

[57] ABSTRACT

Photographic apparatus, e.g., a camera, having a synchronized flash. The camera includes a ranging system, an objective lens assembly movable between first and second positions for focusing an object at the camera's focal plane, a source of artificial illumination for illuminating the object, and a flash fire control in the form of an electronic flash initiation timer. The flash fire control receives an input from the ranging system which is representative of the camera-to-subject distance, and an input from the objective lens assembly upon its release for movement toward the second position. The flash fire control correlates these inputs so as to fire the source of artificial illumination while the lens assembly is still moving toward the second position and the object is in focus. In one embodiment, the intensity and/or the duration of the light from the artificial source of illumination is changed as a function of an exposure parameter, e.g., camera-to-subject distance.

10 Claims, 2 Drawing Figures

PHOTOGRAPHIC APPARATUS HAVING SYNCHRONIZED FLASH

RELATED APPLICATION

This application is in part a continuation of my copending application Ser. No. 145,614 filed May 1, 1980, now abandoned.

BACKGROUND OF THE INVENTION

1. Field of the Invention

This invention relates to photographic apparatus, e.g., cameras, having a synchronized flash.

2. Description of the Prior Art

The prior art is replete with cameras having synchronized flash systems. In some cameras, e.g., see U.S. Pat. No. 3,634,725, the intensity of the light emitted by the flash is a function of the camera-to-subject distance. In other cameras, e.g., see U.S. Pat. No. 3,646,865, the duration of the flash is a function of the camera-to-subject distance. Still others terminate the flash in accordance with the amount of light received from the illuminated object. See U.S. Pat. No. 3,714,443. However, none of the above systems provides a means whereby the output of the ranging system is correlated with the movement of an objective lens assembly so as to provide a fire signal to the flash at the moment that the objective lens assembly is moving through a zone in which the subject to be photographed is in focus. To the contrary, the above cameras appear to have manually operative focusing systems wherein the objective lens assembly is stopped prior to operation of the flash system, when the objective lens assembly is at the precise location whereat the subject is properly focused at the camera's focal plane. This requires precise machining of the threads on the lens barrel, precise range markings on the lens bezel, etc., which adversely affect the cost of the camera.

U.S. Pat. Nos. 4,188,103 and 4,167,316 disclose systems wherein automatic sonic ranging systems produce an output which is continuously compared to a signal which is indicative of the location of an objective lens assembly for providing a fire signal to the flash at the appropriate moment. However, in each system, the objective lens assembly is stopped prior to the firing of the flash. Thus, each system requires an expensive dynamic braking apparatus for stopping the objective lens assembly at the precise location that the subject is in focus.

German Pat. No. 2,943,388 discloses a camera having an automatic focusing system including an automatic ranging system, a lens position sensing device, and a shutter control device which responds both to signals from the automatic ranging system and from the lens position sensing device to control the release of a shutter as the lens passes through a zone in which the subject being photographed is in focus. However, this system is silent as regard synchronized flash systems.

SUMMARY OF THE INVENTION

The instant invention relates to photographic apparatus and, more particularly, to a camera having a synchronized flash which is fired while an objective lens assembly is still moving. The camera is specifically adapted for use under low light conditions, i.e., the light level is low enough that no appreciable exposure is made on a film unit by the ambient light while the shutter is open. In one embodiment of the invention, the camera includes a range finder, a conventional shutter, an objective lens assembly having a fixed aperture, a source of artificial illumination, and an electronic device which functions as a flash fire control. The objective lens assembly, which may be the entire objective lens of the camera but preferably is just one or more of the elements which make up the objective lens, is mounted for movement from a first position to a second position, the latter preferably being closer to the camera's focal plane than the former. The means for driving the objective lens assembly from the first position to the second position may take the form of a tension spring or an electrically powered motor or solenoid.

The camera also includes a means, e.g., a shutter release button, for initiating an exposure cycle. Actuation of the button results in the range finder emitting a signal, either light or sound, which hits the object to be photographed and is at least partially reflected back to the range finder. The reflected signal is received and processed by the range finder so as to find the camera-to-subject distance. A signal representative of this computed distance is then automatically transmitted to the flash fire control. At the same time that the signal is emitted by the range finder, or slightly thereafter, the shutter blades are opened fully and the objective lens assembly is released for movement from the first position to the second position by the aforementioned spring or electrically driven motor or solenoid. In a preferred embodiment of the invention, as the objective lens assembly moves toward the second position, its precise location therebetween is continuously monitored and this information is also fed into the flash fire control. The flash fire control continuously compares these two inputs, i.e., the range finder and objective lens assembly inputs, and signals the source of artificial illumination to fire at substantially the same time that the objective lens assembly passes through a zone wherein the subject to be photographed is correctly focused at the focal plane. After termination of the illumination from the aforementioned source, the shutter is closed and the objective lens assembly is stopped in said second position by any suitable means. The shutter and objective lens assembly may then be manually or automatically reset such that the blade(s) of the former is in its closed position and the latter is in the first position. Alternatively, a single signal representative of the time of release of the objective lens assembly for movement from said first position to said second position may be transmitted to the flash fire control. The flash fire control would then start the count down of a timing period whose duration is a function of the signal previously received by the flash fire control from the range finder. At the end of the time period, the flash fire control would initiate operation of the source of artificial illumination while the objective lens assembly is still moving toward the second position.

It should be noted from the above description, and that to follow, that the cameras described with reference to the instant invention are for use solely when the ambient light level is low enough that no appreciable exposure is made by the ambient light upon a film unit located in position for exposure within the camera; and that the only appreciable exposure of the film unit is the result of the light emanated by the source of artificial illumination. In other words, even though the shutter may be partially or fully open during movement of the objective lens assembly, no blurred image appears on the film unit because it is the source of artificial illumination which in effect functions as a shutter.

The source of artificial illumination may be (1) a conventional electronic flash having a constant total light output; (2) a photocell quench electronic flash whose light output is dependent upon the light reflected from the subject; and (3) a time quench electronic flash whose light output is dependent upon an electronic control circuit.

In another embodiment of the invention, the conventional shutter is replaced by a scanning aperture type shutter, e.g., of the type shown in the aforementioned U.S. Pat. No. 4,167,316. The scanning aperture type shutter is connected to the movable objective lens assembly such that its aperture size increases as the objective lens assembly moves from the first position to the second position. This arrangement allows for a fixed output from the source of artificial illumination and permits the aperture to control the amount of light reaching the film unit.

An object of the invention is to provide a camera with means for comparing the output signal of a range finder with a signal indicative of movement of an objective lens assembly so as to enable the comparing means to fire a source of artificial illumination at substantially the same time that the objective lens assembly is moving through a zone in which a subject to be photographed is correctly focused at the focal plane of the camera.

Another object of the invention is to provide a camera with means for comparing the output of a range finder with the position of a moving objective lens assembly so as to fire a source of artificial illumination at substantially the same time that the objective lens assembly is moving through a zone wherein a subject to be photographed is correctly focused at the focal plane of the camera.

Another object of the invention is to provide a camera with a source of artificial illumination which, in effect, functions as a shutter.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Figure 1:
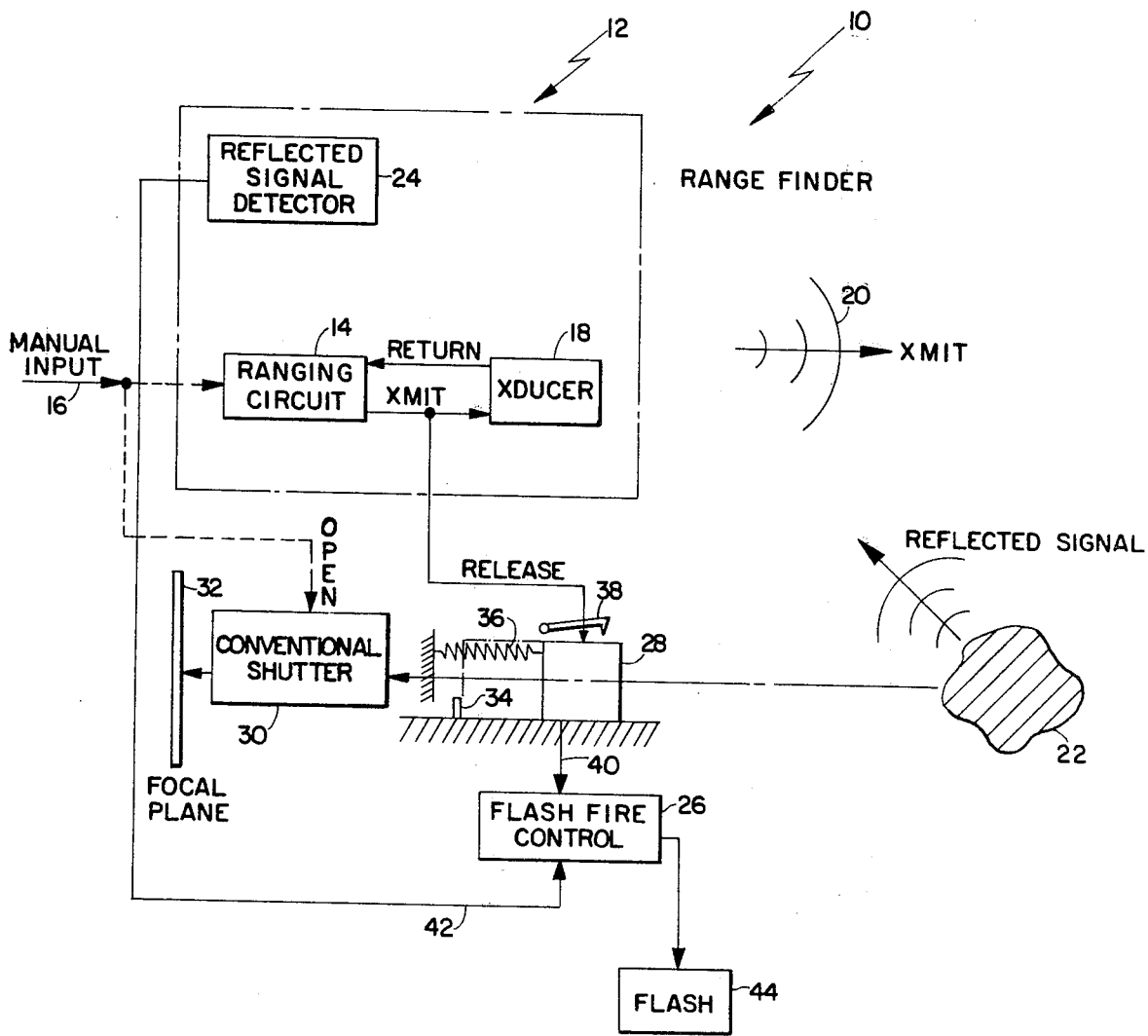
FIG. 1 is a schematic diagram of a preferred embodiment of the instant invention.

Reference is now made to FIG. 1 of the drawings wherein is shown a preferred embodiment of the instant invention. Specifically, FIG. 1 shows photographic apparatus 10, e.g., a camera, having an automatic range finder 12 of the type more fully disclosed in U.S. Pat. No. 4,199,246 and assigned in common with the instant application. The range finder 12, which is preferably of the sonic type, includes a ranging circuit 14 which is responsive to the actuation of an exposure cycle initiator 16 to issue a transmit commence signal to a sonic transducer 18 so as to cause the transmission of a sonar ranging signal comprising a burst of sonic energy, as shown at 20. Thus, the burst of sonic energy 20 is emitted from the transducer 18 in substantial coincidence with the actuation of the exposure cycle initiator 16. Thereafter, the transducer 18 detects an echo signal reflected from a photographed subject, as shown at 22, at an elapsed time interval subsequent to the transmission of the sonar ranging signal 20. An echo or reflected signal detector 24 then provides a signal indicative of this elapsed time period which corresponds to the camera-to-subject distance. This signal, which represents the output of the range finder 12, is then transmitted to a flash fire control 26.

The photographic apparatus 10 also includes a fixed aperture objective lens assembly 28 and a conventional (non-scanning aperture) shutter 30 which cooperate with each other to direct light from the subject 22 to a film unit located in position for exposure at a focal plane 32.

The objective lens assembly 28 is mounted for movement between a first position, as shown in solid lines in FIG. 1, to a second position, shown in broken lines, whereat its travel is arrested by a stop 34 or other suitable means. A spring 36 (or other moving means) operates to bias or drive the objective lens assembly toward the second position and a detent 38 releasably maintains the objective lens assembly 28 in the first position. As the objective lens assembly moves from the first position to the second position, it operates to progressively focus image carrying rays for corresponding subjects located at progressively increasing distances from the camera.

As the objective lens assembly 28 moves from the first position to the second position, its location therebetween is continuously monitored by any suitable means and this information is fed into the flash fire control 26, as indicated by the line 40. The flash fire control 26 compares the input from the range finder 12, as represented by the line 42, with the input at 40 so as to fire a source of artificial illumination 44 at substantially the same time that the objective lens assembly passes through a zone wherein the subject 22 is correctly focused at the focal plane 32. After the source of artificial illumination 44 has been fired, the shutter 30 is closed and the movement of the objective lens assembly 28 is arrested by the stop 34. The blades of the shutter 30 and the objective lens assembly 28 may then be manually or automatically returned to their original positions in preparation for the exposure of the next film unit.

Figure 2:
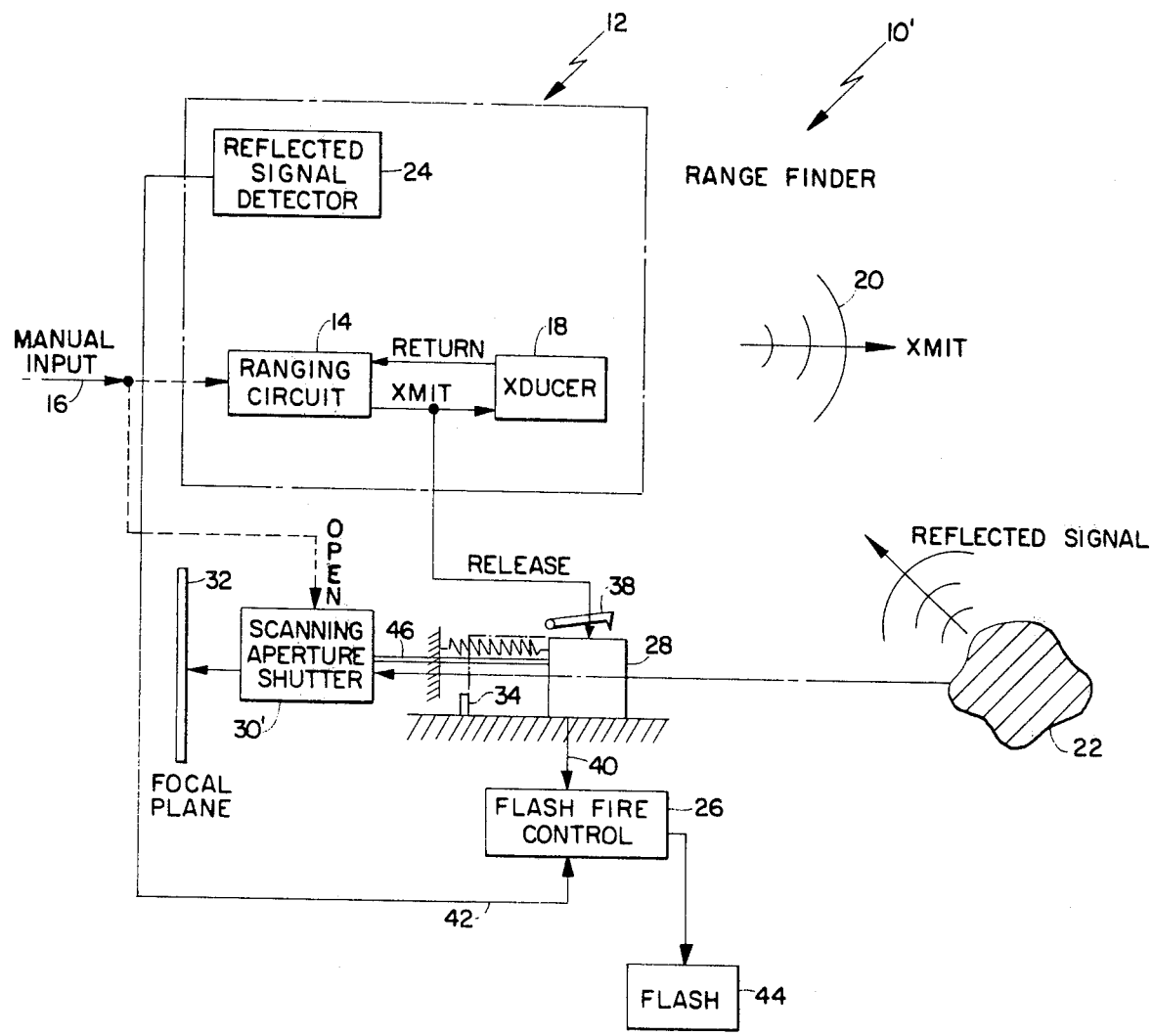
FIG. 2 is a view similar to FIG. 1 showing an alternative embodiment of the invention.

Reference is now made to FIG. 2 of the drawings wherein is shown an alternative embodiment of the instant invention. In this embodiment, the photographic apparatus 10' is similar in many respects to that previously described and, therefore, the same reference characters have been used where applicable. A major change is the replacement of the conventional shutter 30 with a scanning aperture shutter 30'. For example, the shutter 30' may include two overlapping shutter blades which are mounted for sliding movement relative to each other. Each of the shutter blades is provided with an aperture which collectively defines a progressive variation of effective aperture openings in accordance with the displacement of one blade relative to the other. The apertures are selectively shaped so as to overlap a light entry exposure opening in the camera thereby defining a varying effective aperture size as a function of the position of the blades relative to each other. One of the shutter blades is connected to the objective lens assembly 28 by a linkage 46 so as to correlate the size of the effective aperture opening with the position of the objective lens assembly 28. In other words, the effective aperture size progressively increases as the objective lens assembly 28 moves from the first position to the second position.

Since certain changes may be made in the above-described apparatus without departing from the scope of the invention herein involved, it is intended that all matter contained in the description thereof or shown in the accompanying drawings shall be interpreted as illustrative and not in a limiting sense. For example, while the range finder disclosed herein has been described as being of the sonic type, it should be understood that the invention is not so limited. For example, the range finder, in the two embodiments described, may be of the light, vis-a-vis sound, emitting type or it may be of the manually operative type, e.g., like that of U.S. Pat. No. 4,188,103. In either case, the output of the range finder would be sent to the flash fire control where it would be continuously compared with the input 40 in a manner similar to that previously described. Also, instead of the line 40 feeding a continuous reading of the position of the objective lens assembly into the flash fire control, it could merely provide a unitary signal to the flash fire control, which signal would be indicative of the release of the objective lens assembly from the first position. The flash fire control, having previously been fed a signal indicative of the distance of the subject from the camera, could then compute the time required for the objective lens assembly to reach its focused position and start this timing period upon receiving the unitary signal. At the end of the timing period, the flash fire control would fire the source of artificial illumination.

What is claimed is:

1. A camera for use solely when the ambient light level is low enough that no appreciable exposure is made upon a film unit by the ambient light while the shutter is open, comprising:
    means for initiating an exposure cycle;
    ranging means for providing an output representative of the range of a subject to be photographed;
    a shutter responsive to actuation of said initiating means for exposing a film unit located in position for exposure to the low ambient light;
    an objective lens assembly mounted for movement between first and second positions, said objective lens assembly, when located between said first and second positions, being adapted to focus an image of a subject located at varying distances from said camera at the focal plane of said camera;
    means for driving said objective lens assembly from said first position to said second position, said driving means being rendered operative substantially simultaneous with or subsequent to the actuation of said initiating means and said shutter;
    a source of artificial illumination;
    means for comparing the output of said ranging means with movement of said objective lens assembly as it moves from said first to said second position so as to fire said source of artificial illumination at substantially the same time that said objective lens assembly passes through a zone wherein the subject to be photographed is correctly focused at said focal plane; and
    means for stopping said objective lens assembly subsequent to the firing of said source of artificial illumination.

2. A camera as defined in claim 1 wherein said ranging means includes means for automatically determining the camera-to-subject distance.

3. A camera as defined in claim 2 wherein said means for automatically determining the camera-to-subject distance includes means for emitting and receiving sound waves.

4. A camera as defined in claim 3 wherein said source of artificial illumination is a quench strobe and the duration of the period of time that said strobe is illuminated is a function of the camera-to-subject distance.

5. A camera as defined in claim 3 wherein said source of artificial illumination is a quench strobe and the intensity of its illumination is a function of the camera-to-subject distance.

6. A camera as defined in claim 1 wherein said comparing means continuously monitors the position of said objective lens assembly between said first and second positions.

7. A camera as defined in claim 1 wherein said comparing means establishes a timing period whose length is a function of the signal received from said ranging means, and initial movement of said objective lens assembly from said first position starts said timing period such that at the end thereof said source of artificial illumination is fired by said comparing means.

8. A camera for use solely when the ambient light level is low enough that no appreciable exposure is made upon a film unit by the ambient light while the shutter is open, comprising:
    means for initiating an exposure cycle;
    ranging means for providing an output representative of the range of a subject to be photographed, said ranging means including means for emitting and receiving sound waves for automatically determining the camera-to-subject distance;
    a shutter responsive to actuation of said initiating means for exposing a film unit located in position for exposure, said shutter being of the scanning aperture type which, when actuated, produces a predetermined timewise variation in exposure aperture area;
    an objective lens assembly mounted for movement between first and second positions, said objective lens assembly, when located between said first and second positions, being adapted to focus an image of a subject located at varying distances from said camera at the focal plane of said camera;
    means for driving said objective lens assembly from said first position to said second position, said driving means being rendered operative subsequent to actuation of said initiating means;
    a source of artificial illumination;
    means for comparing the output of said ranging means with movement of said objective lens assembly as it moves from said first to said second position so as to fire said source of artificial illumination at substantially the same time that said objective lens assembly passes through a zone wherein the subject to be photographed is correctly focused at said focal plane; and
    means for stopping said objective lens assembly subsequent to the firing of said source of artificial illumination.

9. A camera as defined in claim 8 further including means for coupling the movement of said lens assembly to said scanning shutter such that said comparing means may fire said source of artificial illumination when the position of said lens assembly is indicative of the proper exposure aperture of said shutter for the subject being photographed.

10. A camera as defined in claim 9 wherein the duration of the period of time that said source of artificial illumination is illuminated is constant.

* * * * *